Jan. 16, 1934. J. F. NAYLOR 1,944,103
TRANSFERRING OF INDIVIDUAL ARTICLES SUCH AS BISCUITS
Filed June 6, 1932 4 Sheets-Sheet 1
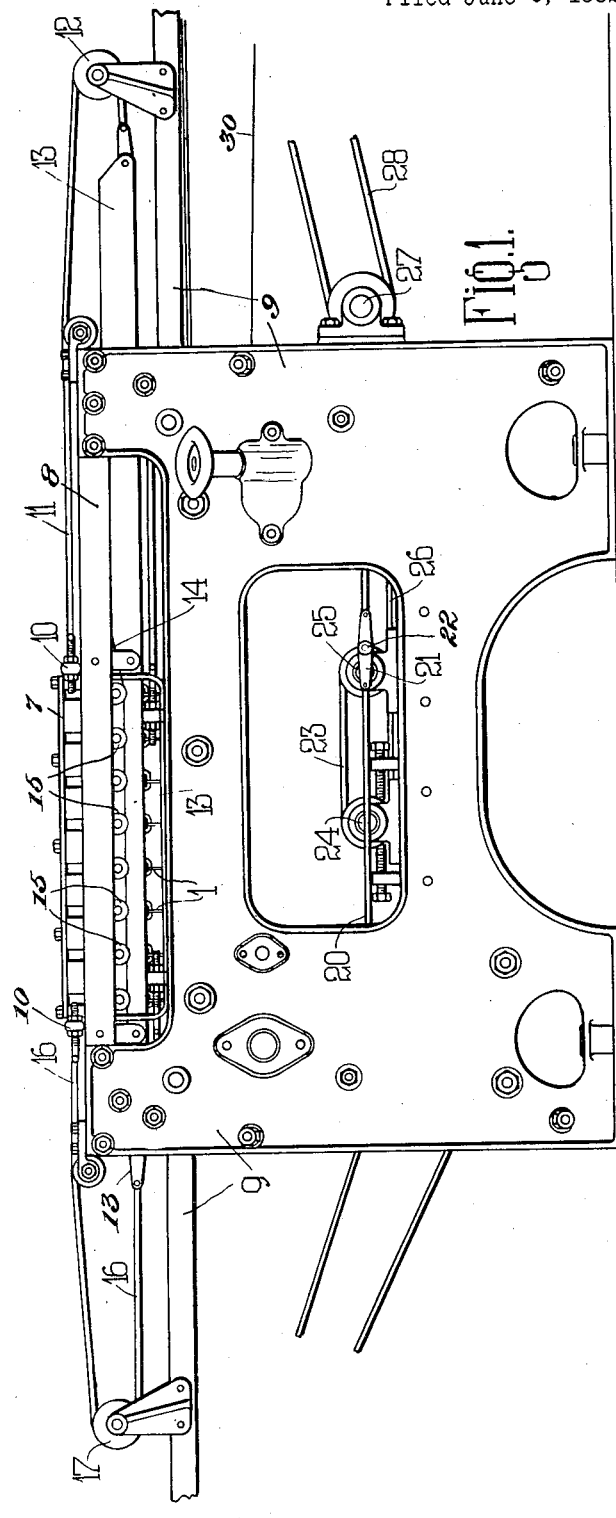
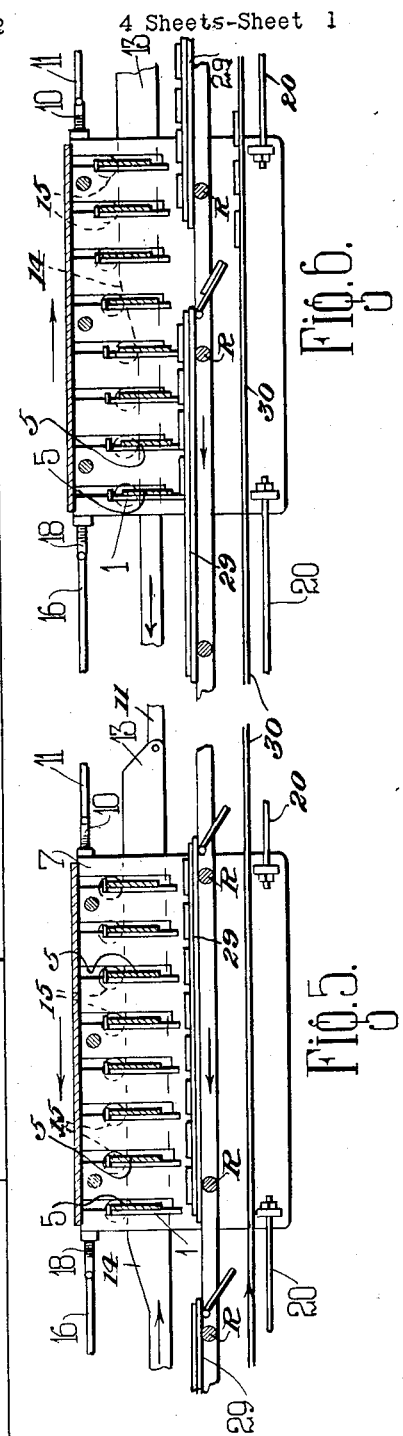
Inventor:
Joseph F. Naylor,
by Attys.

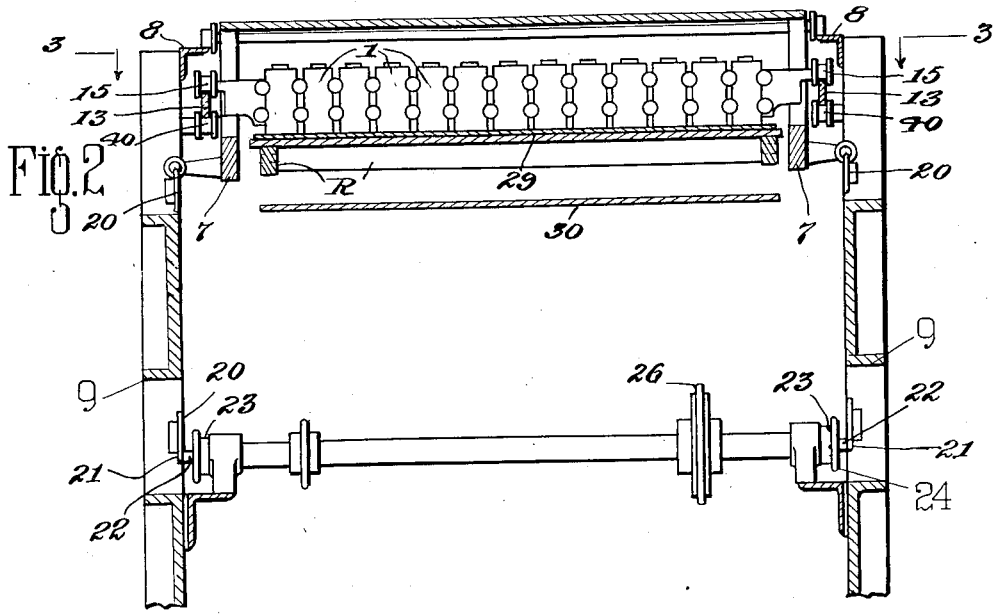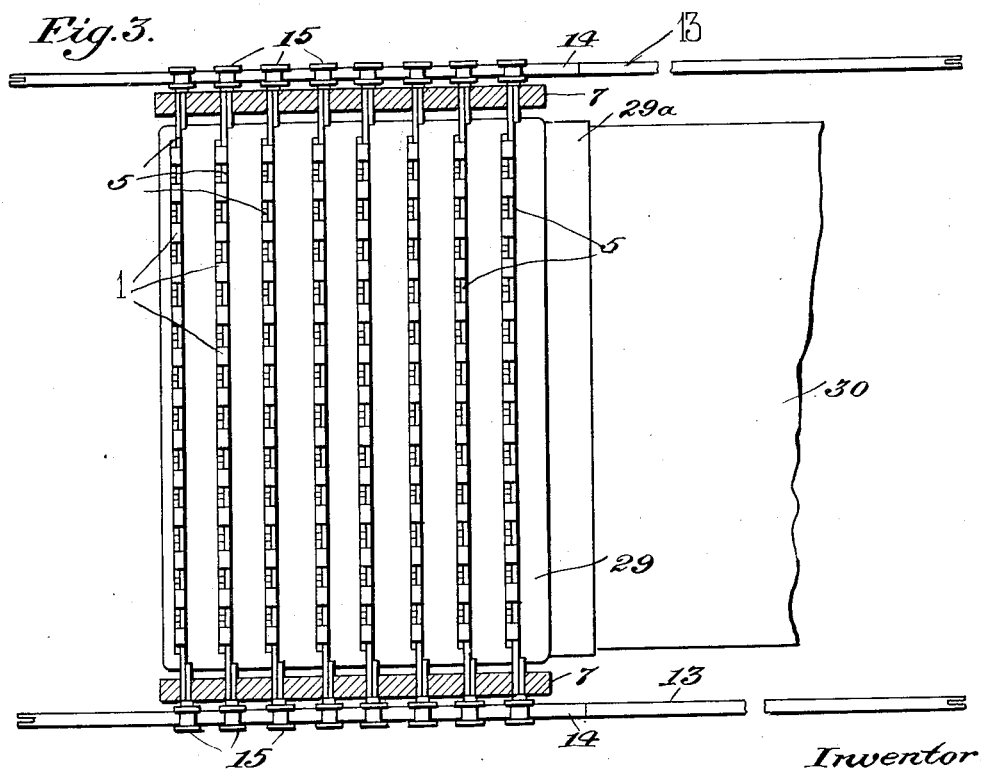

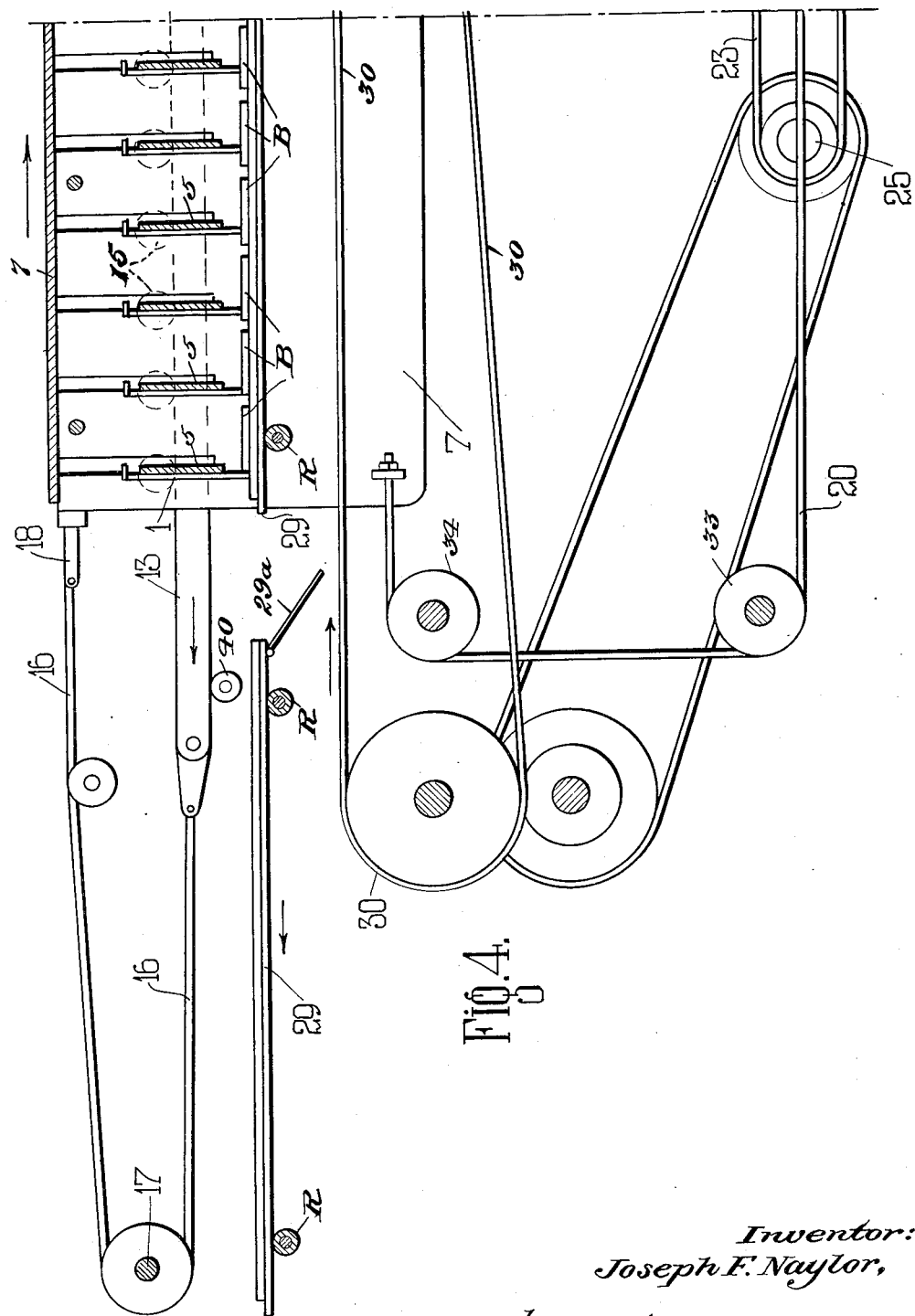

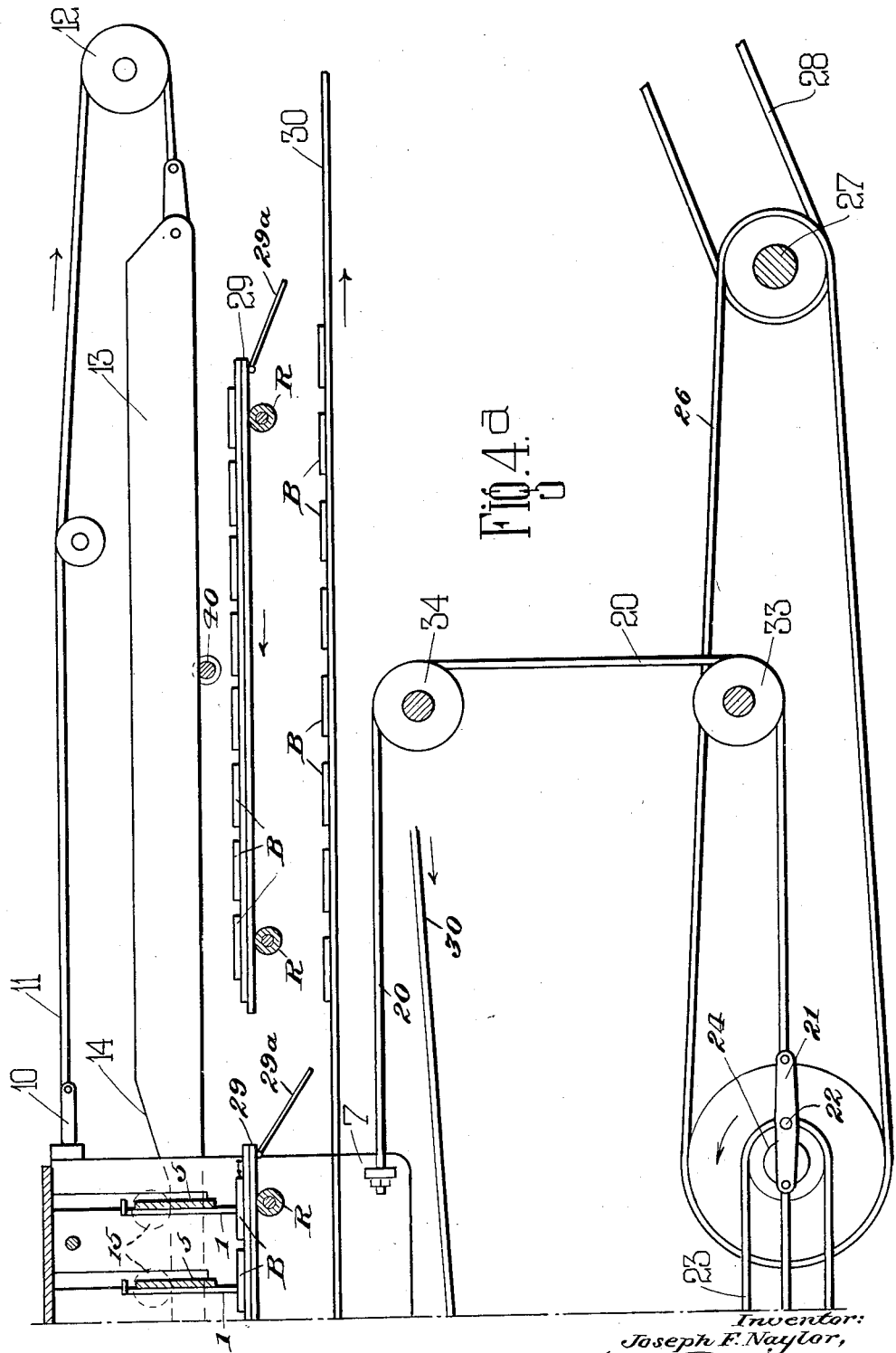

Patented Jan. 16, 1934

1,944,103

UNITED STATES PATENT OFFICE 1,944,103

TRANSFERRING OF INDIVIDUAL ARTICLES SUCH AS BISCUITS

Joseph Francis Naylor, Earlestown, Newton-Le-Willows, England, assignor to T. & T. Vicars Limited, Earlestown, England, a British company Application June 6, 1932, Serial No. 615,731, and in Great Britain April 2, 1932

6 Claims. (Cl. 107—7)

The present invention relates to improvements in transfer means for individual articles, such for instance, as baked biscuits travelling upon pans moving in sequence upon a conveyor from such pans to a separate conveyor.

It has been usual to transfer such biscuits by fingers individually engaging the rows of biscuits on a pan and moving these a row at a time through the gap between successive pans on to a conveyor moving at right angles to the chain conveyor conveying the pans.

According to the present invention, however, the biscuits are removed from successive pans on a conveyor to a second conveyor disposed below the first conveyor and moving axially with it, but usually in the opposite direction.

The invention is more particularly described with reference to the accompanying drawings in which:—

Figure 1 is a side elevation of one form of machine.

Figure 2 is a transverse upright sectional view.

Figure 3 is a sectional view on line 3—3 of Fig. 2.

Figures 4 and 4a are portions of a single view, on an enlarged scale, diagrammatically showing the stripping mechanism and associated parts.

Figure 5 is a diagrammatic view, on a smaller scale than that of Figs. 4 and 4a, showing the stripping fingers clear of the biscuits.

Figure 6 is a similar view, showing the biscuits being stripped and a new pan entering an operative position with respect to the stripping mechanism.

In these drawings, a series of stripping fingers 1 of the usual type are carried slidably on guiding bars 5. A plurality of these fingers are provided on each guide, as shown in Figs. 2 and 3, and a plurality of guide bars are provided. These guide bars 5 are independently slidable vertically in a frame 7 which is adapted to slide back and forth on rails 8 provided on the stationary machine frame 9.

One end of the frame 7 is attached by adjustable connections 10 to flexible chains, cords or the like 11 provided at each side of the machine and passing around idler pulleys or sprockets 12 and connected to the ends of cam bars 13 which have humps 14 for engaging under rollers 15 connected in pairs to the guide bars 5 at the ends thereof. The cam bars 13 are guided by rollers 40 on the frame. The other ends of cam bars 13 are connected to second flexible cords or chains 16 which pass over pulleys 17 and are connected by adjustable connections 18 to the frame 7. By this arrangement, when the frame 7 is moving in one direction, the cam bars 13 are moving at the same speed in the opposite direction.

Driving chains 20 are connected at their ends to the frame 7 for moving the latter back and forth. The chains 20 pass over guide rollers 33 and 34. Intermediate their lengths, the chains 20 are connected to links 21 which have pivotal connections 22 to short endless chains 23 passing over the pairs of sprockets 24 and 25. One of these sprockets, 25 for instance, is driven by a chain or like gearing 26 from a main driving shaft 27 which is rotated from a suitable source of power as by the chain 28 which is associated directly with the conveyor R for moving the baking pans 29. This conveyor R may be formed as usual of side links and cross bars (Figs. 2, 5 and 6), the links having been omitted from Figs. 4 and 4a for clearness.

In operation, as the sprockets 24 and 25 are revolved, the chains 23 are moved continuously in one direction at a speed equivalent to the speed of movement of the pan conveyor R. As these chains 23 carry the pivotal connections 22 in the lower flight of chains 23, the chains 20 pull the frame 7 toward the left, and at the same time the chains or belts 11 operate to pull the cam bars 13 toward the right. The frame 7 at this time is moving substantially at the same speed as the pan conveyor R, and a pan 29 on this conveyor is located within the frame in the position shown in Figs. 4, 4a and 5. As the cam bars 13 move their humps 14 from beneath the rollers 15, these rollers and their bars 5 drop to the lower level of cam bars 13 so that the stripping fingers are coming to rest on, against, or adjacent to the biscuits B carried by the pan 29.

This continues so long as the pivotal connections 22 are moving toward the right with the lower flight of chain 23. During this time, the receiving conveyor 30 continues in its regular progress toward the right in the upper flight, thus removing previously deposited biscuits.

As the pivotal connections 22 pass from the lower to the upper flight of chain 23, the chains 20 bring the frame 7 to a standstill and then reverse its direction of movement. Simultaneously, the direction of movement of cam bars 13 is reversed. During the first part of this reversal and the movement in the opposite direction, the fingers 1 are practically at a standstill, while the pan 29 with the biscuits B thereon continues in its movement toward the left with the continuously moving conveyor R, and hence the fingers 1 strip the biscuits from the pan 29 and guide them down the loose pan slides 29a onto the conveyor 30. Since this stripping is accomplished by reason of the continued movement of conveyor R and pan 29 toward the left, the biscuits are deposited in proper and non-overlapping relationship upon the conveyor 30.

During this time a succeeding pan 29 has been moving toward the position formerly occupied by the preceding pan. As the frame 7 with its stripping fingers 1 and the succeeding pan 29 approach one another, the humps 14 on cam bars 13 again raise the successive rollers 15 whereby the stripping fingers 1 are raised (Fig. 6) out of possible contact with the succeeding pan 29 or the biscuits thereon.

When the pivotal connections 22 come to the left-hand end of their movement in the upper flight of chains 23 and pass around sprockets 25, the frame 7 is brought to a standstill from its rightward movement (Figs. 4, 4a, 5 and 6) and is again moved toward the left at a speed consonant with that of the conveyor R and the pan 29 thereon.

One complete revolution of the chains 23 is timed to be equal to the movement of one pan along the pan conveyor, so that in the complete cycle, the stripping fingers will be held up until they are moving in unison with the particular pan of biscuits underneath them, and while moving with this pan of biscuits, the fingers drop one at a time onto the biscuits and pan until the synchronous movement is complete. Thereupon, the stripping fingers are moved in the opposite direction to the pan of biscuits and carry the biscuits over the rear edge of the pan as the pan continues in its movement. As each stripping finger in turn moves over the rear edge of the pan, it is lifted up so as to clear the biscuits on the next pan, and this backward or rightward movement of the stripping fingers and their frame 7 continues until the fingers are completely over the succeeding pan of biscuits, and then the cycle commences again.

I declare that what I claim is:—

1. A method of transfer for individual articles supported on pans on a conveyor in sequence consisting in stripping rows of such articles in sequence through gaps between successive pans and conveying off the articles so stripped in a direction axial to the motion of said pans.

2. A method of transfer for individual articles supported on pans on a conveyor in sequence consisting in stripping rows of such articles in sequence through gaps between successive pans and conveying off the articles so stripped in a direction axial to the motion of said pans, and in the opposite direction.

3. A mechanism for transferring individual articles from pans moving in sequence on a conveyor, comprising a plurality of fingers, means to engage said fingers, a row at a time behind a row of articles on the pans, means to displace said fingers in the opposite direction to the motion of said pans to strip the articles a row at a time through gaps between the pans and a second conveyor moving axially with the first conveyor and disposed below it to receive said stripped articles.

4. A mechanism for transferring individual articles from pans moving in sequence on a conveyor, comprising a plurality of fingers, means to engage said fingers, a row at a time behind a row of articles on the pans, means to displace said fingers in the opposite direction to the motion of said pans to strip the articles a row at a time through gaps between the pans and a second conveyor moving axially with the first conveyor and disposed below it to receive said stripped articles, and means to drive said second conveyor in a direction opposite said first conveyor.

5. A mechanism for transferring individual articles from pans moving in sequence on a conveyor comprising a conveyor for pans in spaced sequence, a frame, stripping fingers, vertical guides in said frame for said stripping fingers, means to displace said frame axially of the conveyor, means to raise the fingers in sequence and a second conveyor disposed axially beneath the pan conveyor.

6. A mechanism for transferring individual articles from pans moving in sequence on a conveyor comprising a conveyor for pans in spaced sequence, a frame, stripping fingers, vertical guides in said frame for said striping fingers, a flexible element connected at both ends to the frame and passing over guide sprockets, a cam member connected to said flexible element to lift said fingers in sequence, a second flexible element connected at both ends to said frame, means to oscillate said second flexible element and a second conveyor disposed axially beneath said first conveyor.

JOSEPH FRANCIS NAYLOR.